(12) United States Patent
Boswell et al.

(10) Patent No.: US 8,189,792 B2
(45) Date of Patent: May 29, 2012

(54) METHOD AND APPARATUS FOR PERFORMING CRYPTOGRAPHIC OPERATIONS

(75) Inventors: Brent Boswell, Aloha, OR (US); Kirk Yap, Framingham, MA (US); Gilbert Wolrich, Framingham, MA (US); Wajdi Feghali, Boston, MA (US); Vinodh Gopal, Westboro, MA (US); Srinivas Chennupaty, Portland, OR (US); Makaram Raghunandan, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 1177 days.

(21) Appl. No.: 12/005,680

(22) Filed: Dec. 28, 2007

(65) Prior Publication Data

US 2009/0168999 A1 Jul. 2, 2009

(51) Int. Cl.
*G06F 21/00* (2006.01)
(52) U.S. Cl. ....................................................... 380/280
(58) Field of Classification Search .................. 380/280
See application file for complete search history.

(56) References Cited

U.S. PATENT DOCUMENTS

| | | | |
|---|---|---|---|
| 6,195,756 B1 * | 2/2001 | Hurd | 713/340 |
| 6,298,136 B1 * | 10/2001 | Den Boer | 380/29 |
| 6,751,319 B2 * | 6/2004 | Luyster | 380/37 |
| 2003/0202658 A1 * | 10/2003 | Verbauwhede | 380/43 |
| 2005/0058285 A1 * | 3/2005 | Stein et al. | 380/29 |
| 2006/0002549 A1 * | 1/2006 | Avasarala et al. | 380/44 |
| 2006/0206726 A1 * | 9/2006 | Wasson et al. | 713/189 |
| 2007/0157030 A1 | 7/2007 | Feghali et al. | 713/189 |

OTHER PUBLICATIONS

Federal Information Processing Standards Publication 197, Announcing the Advanced Encryption Standard (AES), Nov. 26, 2001, pp. 1-51.

* cited by examiner

*Primary Examiner* — Michael S McNally
(74) *Attorney, Agent, or Firm* — Trop, Pruner & Hu, P.C.

(57) ABSTRACT

In one embodiment, the present invention includes a processor having logic to perform a round of a cryptographic algorithm responsive to first and second round micro-operations to perform the round on first and second pairs of columns, where the logic includes dual datapaths that are half the width of the cryptographic algorithm width (or smaller). Additional logic may be used to combine the results of the first and second round micro-operations to obtain a round result. Other embodiments are described and claimed.

15 Claims, 8 Drawing Sheets

METHOD AND APPARATUS FOR PERFORMING CRYPTOGRAPHIC OPERATIONS

BACKGROUND

Cryptographic operations such as an Advanced Encryption Standard (AES) operation are typically implemented in software for execution on generic processor hardware. Many processors include datapaths of fixed widths such as 64, 86, or 128 bits. Given limited hardware and instruction support for cryptographic operations, is difficult to efficiently perform such operations on existing processors.

Further, processor floorplans have a wide X dimension and a critical Y dimension with a high aspect ratio. Any increase in the Y dimension adds to the growth of the overall chip. The allocated Y budget is very small and thus there is a need to find a minimal area solution at a good performance for the round operations. The performance has latency and throughput considerations; some modes of the AES algorithm are serial in nature where latency of the operations is an issue, whereas others are parallelizable and throughput is more of an issue. Furthermore, splitting key generation across the dual execution pipes involves many bits of information that must cross back and forth between the pipes, which implies large buses that add to the critical height of the chip.

DETAILED DESCRIPTION

In various embodiments, cryptographic operations can be mapped to a processor having multiple datapaths of a smaller width than a width of the operands used in the cryptographic operation. In this way, such operations can be efficiently performed while using a limited amount of floorplan of a processor.

While the scope of the present invention is not limited in this regard, some embodiments may be directed to parallel datapaths that can be used to perform AES operations and more particularly AES round operations. This also may be in accordance with the Federal Information Processing Standards (FIPS) specification, entitled "Advanced Encryption Standard" (AES), dated Nov. 26, 2001. The AES algorithm operates on a 4×4 array of bytes, termed the state. For encryption, each round of AES (except the last round) consists of four stages: (1) AddRoundKey where each byte of the state is combined with a round key, and each round key is derived from the cipher key using a key schedule; (2) SubBytes, which is a non-linear substitution step where each byte is replaced with another according to a lookup table; (3) ShiftRows, which is a transposition step where each row of the state is shifted cyclically a certain number of steps; and (4) MixColumns which is a mixing operation that operates on the columns of the state, combining the four bytes in each column using a linear transformation.

Figure 1A:
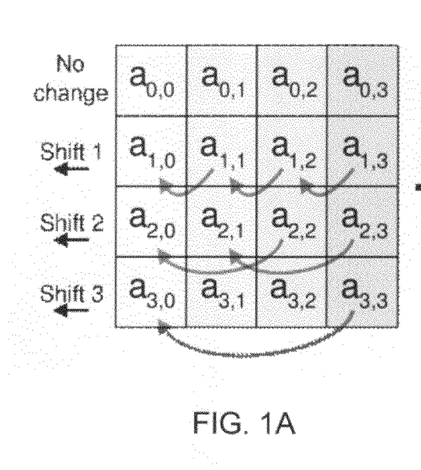
FIGS. 1A-1D are block diagrams of a shift row operation and a mix column operation in accordance with one embodiment of the present invention.
Figure 1B:
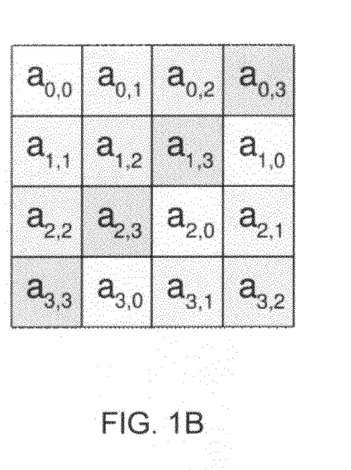

The final round replaces the MixColumns stage with another instance of AddRoundKey. Decryption is similar and is not described here. The first two steps work on a byte-level of the state. The third step treats the state as consisting of four rows in which no change is made to the first row, the second row is shifted left one column, the third row is shifted left two columns, and in the fourth row, each element is left shifted three columns. An example of such a shift row operation is shown in FIGS. 1A and 1B, which show respectively a 4×4 array of bytes prior to and after a shift row operation.

Figure 1C:
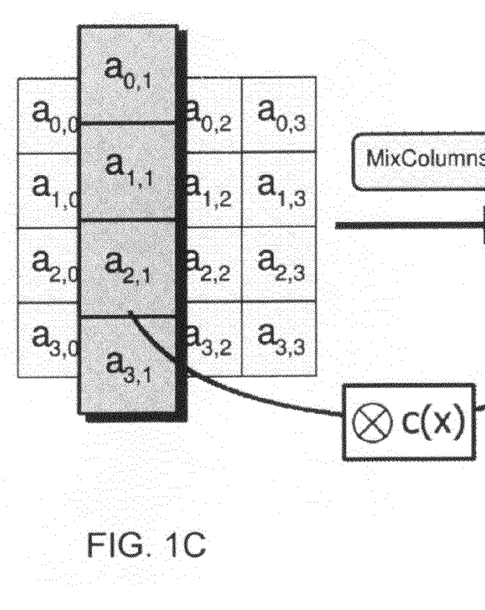
Figure 1D:
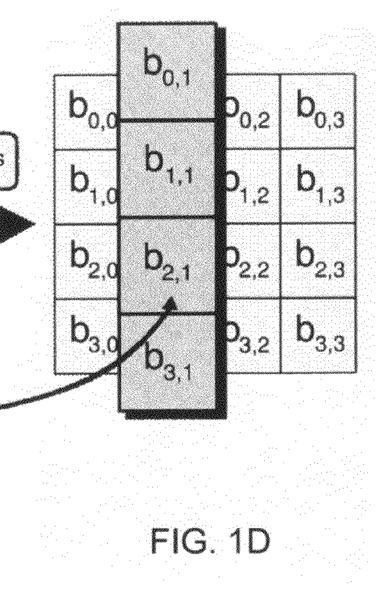

As described, the last step, MixColumns, treats the state as consisting of 4 columns, in which the four bytes of each column of the state are combined using an invertible linear transformation. The MixColumns function takes four bytes as input and outputs four bytes, where each input byte affects all four output bytes. Together with ShiftRows, MixColumns provides diffusion in the cipher. Each column is treated as a polynomial over a GF ($2^8$) and is then multiplied modulo $x^4+1$ with a fixed polynomial $c(x)=3x^3+x^2+x+2$. The MixColumns step can also be viewed as a matrix multiply in Rijndael's finite field. An example of a mix columns operation is shown in FIGS. 1C and 1D, which show a state of the 4×4 array before and after the mix columns operation.

Conventional hardware designs find it convenient to implement the AES in terms of columns. A full implementation of the round hardware requires logic for all 4 columns. This gives the highest performance but is very expensive in terms of area. While 2 or 1 columns can be implemented in the hardware, and each round is made into a multi-pass operation, performance can be negatively impacted. A 2-column solution is described herein, although embodiments can be extended to a 1-column implementation.

Constraints in some processor micro-architectures make some partial column approaches very difficult. These constraints include the execution pipeline has to have a fixed latency of four cycles and a throughput of single-cycle. This implies that every cycle a new micro-operation (μop) can be issued to the pipe. A μop can have at most 2 source registers and 1 destination register, which complicates splitting a round operation into 2 μops, since the key has to be sourced as well into the round operations.

In various embodiments, to reduce these problems of area and performance and pipeline constraints, a round operation can be defined in terms of 3 μops and the area for two columns is implemented in hardware; one column per each data-path. In one embodiment, the round operation consists of a Round.upper μop, a Round.lower μop, and a merge μop. The merge μop can be bit-wise exclusive OR (XOR) μop that can execute in parallel on other ports, providing greater throughput performance.

Figure 2:
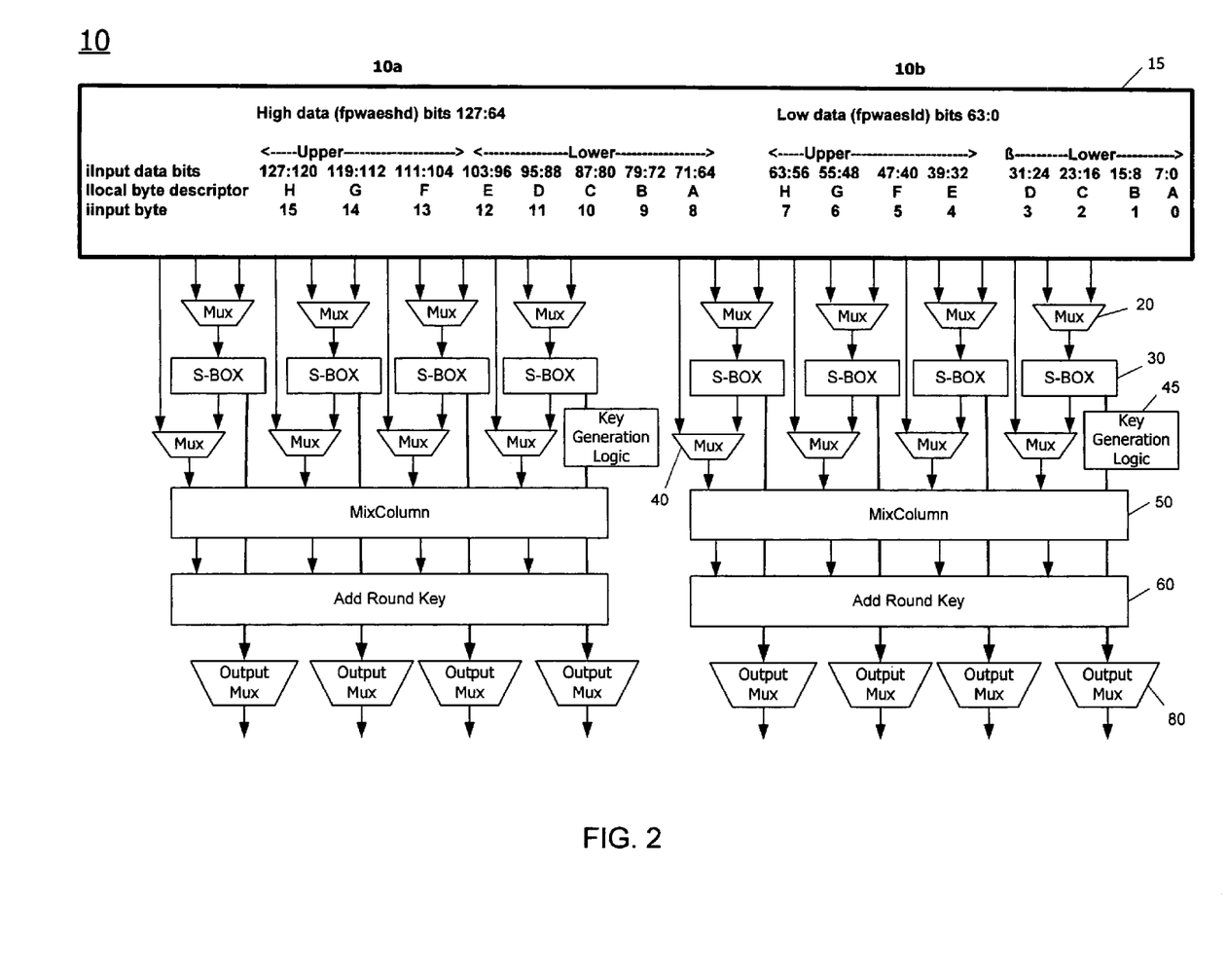
FIG. 2 is a block diagram of datapaths in accordance with one embodiment of the present invention.

Referring now to FIG. 2, shown is a block diagram of datapaths for use in an AES algorithm in accordance with one embodiment of the present invention. As shown in FIG. 2 datapath 10 receives source operands of 128 bits (128 b) of incoming data, each with a high data portion corresponding to bits 127:64 and a low order portion corresponding to bits 63:0. As described further below for round operations, this data may be input data and a round key. Specifically, as shown in FIG. 2, datapath 10 includes a left or upper datapath $10_a$ and a right or lower datapath $10_b$. The incoming data is provided to input logic 15 (shown as a single logic, although in various embodiments, each datapath may include independent input logic) which operates to pass bytes of the incoming data directly through to a first level of multiplexers 20 of the same datapath, or to swizzle the data to the other datapath, as shown in logic 15. Multiplexers 20 act to select one of two bytes of the data provided at its input (i.e., based on a given operation, e.g., a round upper or round lower, described below). From multiplexers 20, the incoming data is provided to a substitution box (SBox) 30 that can perform encryption/decryption operations. More specifically, SBox 30 may include a non-linear substitution table to perform byte substitution transformations. SBox 30 may also include an inverse SBox function to perform decryption operations. The output of SBox 30 is provided to a second level of multiplexers 40 that select from the SBox outputs or an input directly received from input logic 15. Note further that the lowest order SBox 30 of each datapath has an output coupled to a key generation logic 45. Key generation logic 45 may be a small amount of hardware or other such logic to aid in handling dynamic or on-the-fly key generation. Specifically, key generation logic 45 may perform rotate word operations or XOR operations in key generation modes of operation.

Referring still to FIG. 2, the output of multiplexers 40 (and key generation logic 45) is provided to a mix column logic 50 that can perform the mix column function for encryption operations as well as an inverse mix column operation for decryption operations. In one embodiment, mix column logic 50 may perform a transformation to take the columns of the state and mix their data (independently) to generate new columns. After such operations, the mix column outputs are provided to round key logic 60 which may perform a conditional XOR of the mixed column data with the round key. The output of logic 60 is provided to output multiplexers 80 which provide the output data, which may be encrypted data or decrypted data, and which may correspond to a portion of a final result of a round operation depending on the mode of operation. Note that while datapaths 10a and 10b are 64 bit datapaths, after multiplexers 20, 32 bits of data are provided therefrom to SBox logic 30 on each datapath. Thus for each round performed, portions of the same source data (i.e., 128 bits of data and the 128 bit round key) pass through datapaths 10a and 10b twice in order to generate the round results. For each round µop, 64 bits are output, although half of those bits for each µop are zero. Then the two temporary results can be combined together, e.g., via an OR operation or an XOR operation to generate the final result.

While shown with this particular implementation in the embodiment of FIG. 2, the scope of the present invention is not limited in this regard. For example, in other embodiments, in addition to round key logic 60, a similar logic for decryption operations may be coupled between SBox logic 30 and multiplexers 40 to perform a conditional XOR of the SBox data output with the round key. Instead in the embodiment of FIG. 2, when performing decryption operations, keys for decryption pass through an inverse mix column operation in mix column logic 50 before they are provided for decryption round operations in round key logic 60.

The four columns of the data block (as shown in FIG. 1C) map to the left/right datapaths of FIG. 2 "in a natural way", i.e., columns {1, 2} are computed on the left data-path 10a and columns {3, 4} on the right datapath 10b. The round.upper µop computes the results of columns {1, 3} and the round.lower µop computes the results of columns {2, 4}. Both round µops operate on the same two source registers: original state and round-key. Since there is no data dependency between them, they can be issued one after the other. If we denote the four columns of the expected round output as R1 . . . R4, where each R is a 32 bit word, the round.upper µop produces [R1, 0, R3, 0] as a first temporary result and the round.lower µop produces [0, R2, 0, R4] as a second temporary result, which may be stored in destination storages, such as registers. The third µop is a bit-wise XOR of the two temporary results that produces the expected result [R1,R2, R3,R4]. Furthermore, to enable greater simplicity in the hardware of the datapaths and improve processing throughput, this XOR operation may be performed on separate logic coupled to hardware 10. For example, in some embodiments another execution unit of a processor, such as an arithmetic logic unit (ALU) may perform the XOR operation on the two temporary results.

Referring now to Table 1, shown is a scheduling of an AES round operation on the hardware of FIG. 2 in accordance with an embodiment of the present invention. As shown in Table 1, each round (after the trivial round 0) performs the round.upper and round.lower µops as well as the merge µop (i.e., PXOR). Still further, in the embodiment shown in Table 1, dynamic key encryption may also be performed as shown in the schedule. In Table 1, the operands used to execute the µops are indicated as Source 1 and Source 2 (i.e., src1 and src2) and a result of a given µop is stored in a destination location, i.e., dest. Table 1 further shows the cycle numbers and latency counts for the given µops, as well as the corresponding round iteration with which even µop is associated.

TABLE 1

| UOP | src1 | src2 | dest | latency | Cycle # | Round |
| --- | --- | --- | --- | --- | --- | --- |
| Pxor | data_in[0] | key[0] | data_in[1] | 1 | 1 | 0 |
| AES_ENC_KEY_ROUND_128 | XXXX | key[0] | key[1] | 4 | 1 | |
| AES_ENC_ROUND.L | data_in[1] | key[1] | sb12[1] | 4 | 5 | 1 |
| AES_ENC_ROUND.H | data_in[1] | key[1] | sb34[1] | 4 | 6 | |
| AES_ENC_KEY_ROUND_128 | XXXX | key[1] | key[2] | 4 | 7 | |
| | | | | | 8 | |
| | | | | | 9 | |
| pxor | sb12[1] | sb34[1] | data_in[2] | 1 | 10 | |
| AES_ENC_ROUND.L | data_in[2] | key[2] | sb12[2] | 4 | 11 | 2 |
| AES_ENC_ROUND.H | data_in[2] | key[2] | sb34[2] | 4 | 12 | |
| AES_ENC_KEY_ROUND_128 | XXXX | key[2] | key[3] | 4 | 13 | |
| | | | | | 14 | |
| | | | | | 15 | |
| pxor | sb12[2] | sb34[2] | data_in[3] | 1 | 16 | |
| AES_ENC_ROUND.L | data_in[3] | key[3] | sb12[3] | 4 | 17 | 3 |
| AES_ENC_ROUND.H | data_in[3] | key[3] | sb34[3] | 4 | 18 | |
| AES_ENC_KEY_ROUND_128 | XXXX | key[3] | key[4] | 4 | 19 | |
| | | | | | 20 | |
| | | | | | 21 | |
| pxor | sb12[3] | sb34[3] | data_in[4] | 1 | 22 | |
| AES_ENC_ROUND.L | data_in[4] | key[4] | sb12[4] | 4 | 23 | 4 |
| AES_ENC_ROUND.H | data_in[4] | key[4] | sb34[4] | 4 | 24 | |
| AES_ENC_KEY_ROUND_128 | XXXX | key[4] | key[5] | 4 | 25 | |

TABLE 1-continued

| UOP | src1 | src2 | dest | latency | Cycle # | Round |
|---|---|---|---|---|---|---|
|  |  |  |  |  | 26 |  |
|  |  |  |  |  | 27 |  |
| pxor | sb12[4] | sb34[4] | data_in[5] | 1 | 28 |  |
| AES_ENC_ROUND.L | data_in[5] | key[5] | sb12[5] | 4 | 29 | 5 |
| AES_ENC_ROUND.H | data_in[5] | key[5] | sb34[5] | 4 | 30 |  |
| AES_ENC_KEY_ROUND_128 | XXXX | key[5] | key[6] | 4 | 31 |  |
|  |  |  |  |  | 32 |  |
|  |  |  |  |  | 33 |  |
| pxor | sb12[5] | sb34[5] | data_in[6] | 1 | 34 |  |
| AES_ENC_ROUND.L | data_in[6] | key[6] | sb12[6] | 4 | 35 | 6 |
| AES_ENC_ROUND.H | data_in[6] | key[6] | sb34[6] | 4 | 36 |  |
| AES_ENC_KEY_ROUND_128 | XXXX | key[6] | key[7] | 4 | 37 |  |
|  |  |  |  |  | 38 |  |
|  |  |  |  |  | 39 |  |
| pxor | sb12[6] | sb34[6] | data_in[7] | 1 | 40 |  |
| AES_ENC_ROUND.L | data_in[7] | key[7] | sb12[7] | 4 | 41 | 7 |
| AES_ENC_ROUND.H | data_in[7] | key[7] | sb34[7] | 4 | 42 |  |
| AES_ENC_KEY_ROUND_128 | XXXX | key[7] | key[8] | 4 | 43 |  |
|  |  |  |  |  | 44 |  |
|  |  |  |  |  | 45 |  |
| pxor | sb12[7] | sb34[7] | data_in[8] | 1 | 46 |  |
| AES_ENC_ROUND.L | data_in[8] | key[8] | sb12[8] | 4 | 47 | 8 |
| AES_ENC_ROUND.H | data_in[8] | key[8] | sb34[8] | 4 | 48 |  |
| AES_ENC_KEY_ROUND_128 | XXXX | key[8] | key[9] | 4 | 49 |  |
|  |  |  |  |  | 50 |  |
|  |  |  |  |  | 51 |  |
| pxor | sb12[8] | sb34[8] | data_in[9] | 1 | 52 |  |
| AES_ENC_ROUND.L | data_in[9] | key[9] | sb12[9] | 4 | 53 | 9 |
| AES_ENC_ROUND.H | data_in[9] | key[9] | sb34[9] | 4 | 54 |  |
| AES_ENC_KEY_ROUND_128 | XXXX | key[9] | key[10] | 4 | 55 |  |
|  |  |  |  |  | 56 |  |
|  |  |  |  |  | 57 |  |
| pxor | sb12[9] | sb34[9] | data_in[10] | 1 | 58 |  |
| AES_ENC_ROUND_LAST.L | data_in[10] | key[10] | sb12[10] | 4 | 59 | 10 |
| AES_ENC_ROUND_LAST.H | data_in[10] | key[10] | sb34[10] | 4 | 60 |  |
| AES_ENC_KEY_ROUND_128 | XXXX | key[10] | key[11] | 4 | 61 |  |
|  |  |  |  |  | 62 |  |
|  |  |  |  |  | 63 |  |
| pxor | sb12[10] | sb34[10] | Data_Out | 1 | 64 |  |

In this implementation, the round operation can be achieved under scheduling conditions in accordance with an embodiment of the present invention in six cycles of latency per round. Thus the AES 128 encrypt schedule shown in Table 1 should take 10*6=60 cycles; the few extra cycles are due to the trivial round0 operation. Since the PXOR μop is issued in parallel on another port, the throughput is constrained by the three μops issued per round in the AES unit (one related to key generation) which accounts for three cycles per round. Therefore in parallel AES modes (or multi-threaded) a throughput of 30 cycles per AES-128 operation can be realized. This is roughly 10× faster than a software implementation of AES on a processor.

Thus in various embodiments, the AES round operations can be split across two 64b datapaths, using an implementation of 2 AES colunms. Further, a mapping of round operations to micro-operations with the constraints of the pipeline/scheduler to maximize performance/area can thus be realized using an optimal schedule of μops, which can be stored in a microcode read only memory (ROM). In some embodiments, 16 bits of data can be transferred from left to right and right to left for shift row operations using a dedicated 32b bus, e.g., in the input logic.

Embodiments may enable high performance at very high clock speeds, while providing area-efficiency, enabling implementation of a 128-bit algorithm on dual 64-bit execution data-paths with minimal μops and good performance and minimizing the area required on the core. Embodiments can also be extended to a 1-column implementation at lower performance and more area-savings.

In various embodiments, such as in connection with the datapath described above regarding FIG. 2, or independently, dynamic or on-the-fly key generation may also be performed. Such key generation operations can use the benefits of the split datapath to enable scheduling of data movement to minimize the amount of bus and area needed for key generation, without adding to the critical path. More specifically as will be discussed below, early (i.e., first cycle) data movements permit maximum sharing of buses between key generation and round operations. Furthermore, implementing a key generation μop in connection with a shuffle or other permute-type instruction (e.g., a given quad word shuffle μop) can enable dynamic generation of key data for 192/256 bit key generation operations. In one embodiment, a shuffle instruction, e.g., a quadword shuffle μop can be used to swap quadwords (qw) (which may be 64 bits) between the two datapaths. Table 2 shows a description of a shuffle μop in accordance with one embodiment of the present invention.

TABLE 2 pint_shuffle_qw
dest := pint_shuffle_qw(source2,source1), immediate

This micro-instruction implements the shuffle of QW data between the two halves of the 128 bit datapath. This μop selects any two pieces of 64 bits each out of the two 128 bit sources (source1 and source2), pointed to by 4 bit immediate data. The result is stored in a destination location, dest.

In one embodiment, source1 and source2 are 128-bit packed elements that can be used to form the result, while destination is the register where the selected elements are stored. The immediate data may be a shuffle_select_modifier which is one of the modifiers described below that is used to specify the source of the immediate data. In turn, the immediate data is used to select which QW elements of source2 and source1 get stored in the destination.

The following code of Table 3 describes the operation performed by this micro-operation.

TABLE 3

```
pint_shuffle_qw(source2, source1), shuffle_select_modifier [3:0]; {
        dest[63:0] := Switch shuffle_select_modifier [1:0] {
                            0: source1[63:0];
                            1: source1[127:64];
                            2: source2[63:0];
                            3: source2[127:64];
                        }
        dest[127:64] := Switch shuffle_select_modifier [3:2] {
                            0: source1[63:0];
                            1: source1[127:64];
                            2: source2[63:0];
                            3: source2[127:64];
                        }
}
```

All key-sizes for encryption are performed using a 64-bit shared bus. More specifically, a 32b left to right (L to R) and a 32b right to left (R to L) bus (which may be implemented in input logic 15 of FIG. 2) are used by the key scheduler in the first cycle. The decryption can be done in a similar fashion. In contrast to conventional methods, just 64 total wires are used for both key generation and round operations.

As will be described below, all data transfers are done in the very first cycle because the critical path is one XOR3 delay (+some MUX delays for choosing amongst the cases). In some cases, this means that redundant SBox computations are performed in both datapaths to be able to make an early crossing; this comes for nearly free from an area perspective (ignoring power) since there is a minimum of eight SBoxes (four on each side as shown in FIG. 2) and key generation requires just four. Thus this is an opportunity for sharing the 64 wires from key generation with the 32/48 wires for round data transfers for a total of 64 wires. Rotate word (Rotword), (i.e., a cyclic permutation), and round constant (RCON) can be performed on both datapaths, e.g., in key generation logic 45.

Figure 3A:
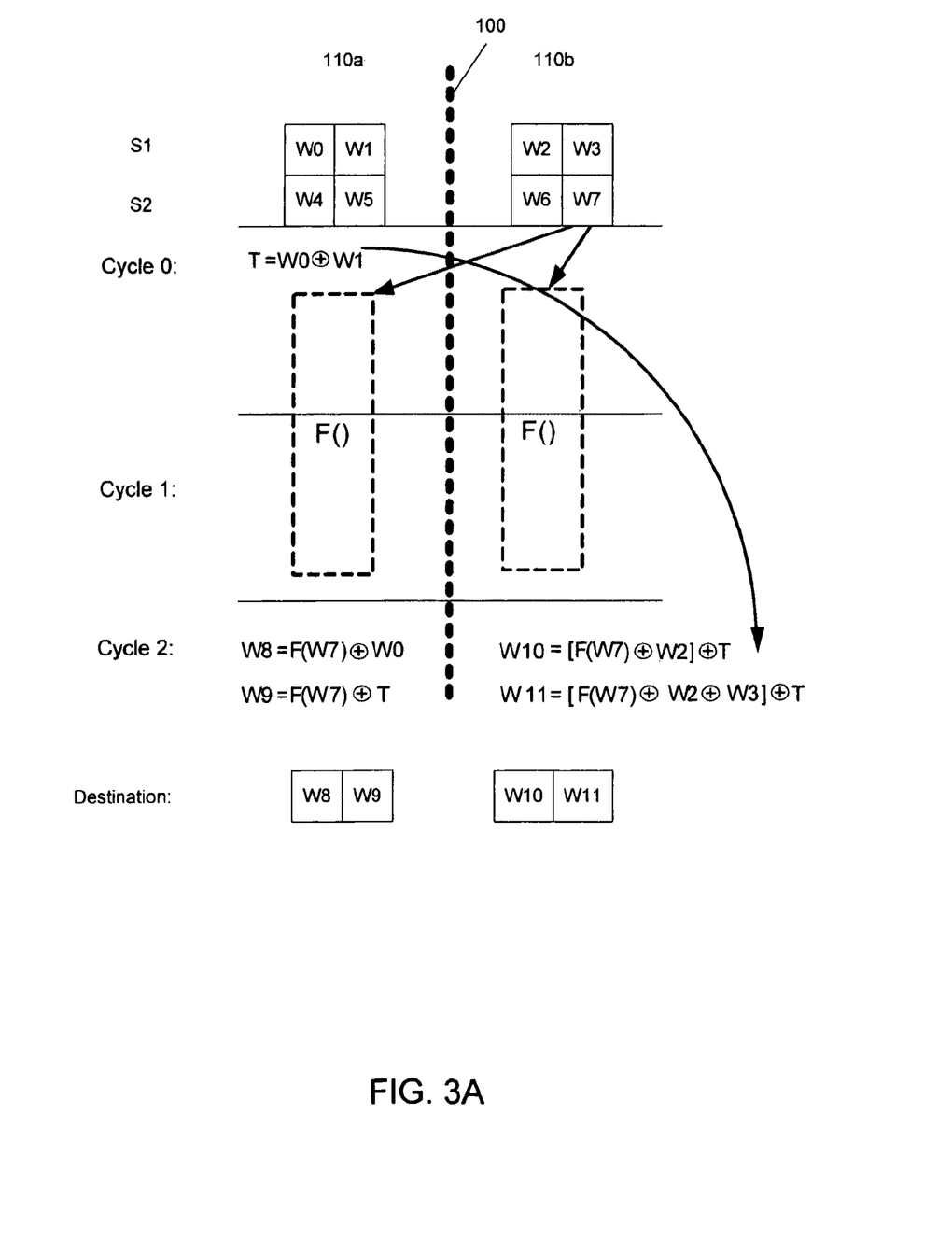
FIGS. 3A-3D are block diagrams of encryption key operations in accordance with one embodiment of the present invention.

FIG. 3A shows the 256b encrypt case. Note that FIGS. 3A-3D focus on the data movement. The blocks that perform the transform F(.) do Subword(Rotword(T))+RCON or just Subword(T) as specified in the key generation standard, depending on the key-size and round iteration number. The dashed line in FIG. 3A 100 refers to the delineation between upper datapath $110_a$ and lower datapath $110_b$ which, in one embodiment may correspond to the datapaths 10 shown in FIG. 2. As shown in FIG. 3A, two incoming operands S1 and S2 provide 128 bits of data, namely 4 32b words. To implement the key generation µop, in a first cycle (i.e., cycle 0), early data movement of word 7 (W7), e.g., via a 32b R to L bus occurs. Similarly, a resulting temporary value T of a logical bitwise XOR of words W0 and W1 is also transferred from datapath $110_a$ to datapath $110_b$ in this first cycle via a L to R 32b bus. In the second cycle, a predetermined function F( ) may be performed in both datapaths on the same data. In various embodiments, this redundant function may reuse hardware existing in the encryption datapath, namely various logic of datapaths $10_a$ and $10_b$, e.g., SBoxes 30, along with key generation logic 45 In cycle 1, word 7 is applied to the function. Then in the third cycle (i.e., cycle 2), the value of words 8-11 are determined as indicated, resulting in storage of this result in a destination storage of the words W8-W11. Note that this 256b encrypt case is identical to the 128 case (not shown). The only difference in the 128 case is that F(w3) is used as input instead of F(w7) in all the computations.

Figure 3B:
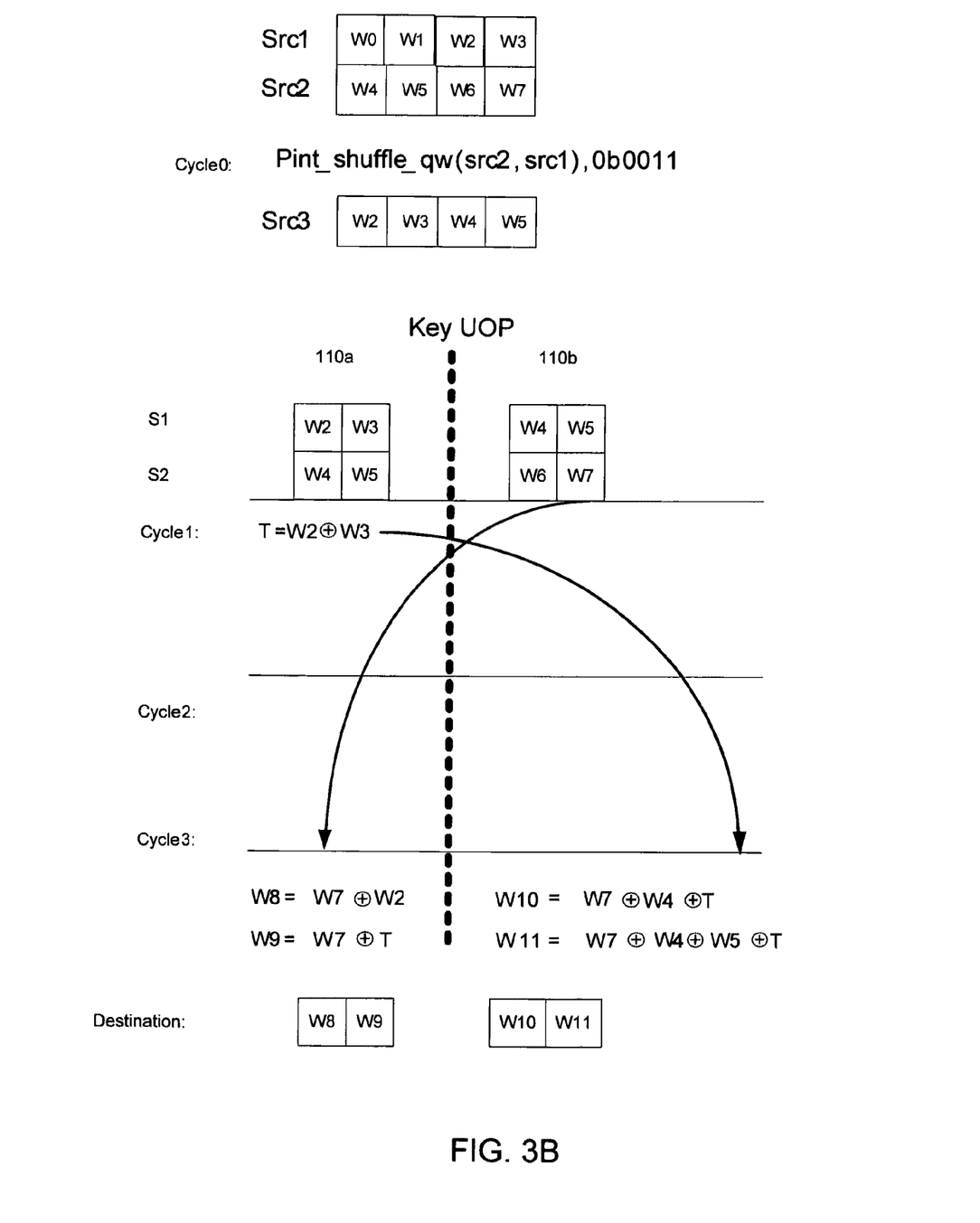

Referring now to FIG. 3B, shown is data movement for a 192 encryption case, and more specifically for a given round [2+3i]. As shown in FIB. 3B, in a first cycle (i.e., cycle 0) a shuffle operation may be performed, e.g., on other hardware such as a shuffle unit coupled to the datapaths to thus permute data from a pair of sources SRC1 and SRC2 into a resulting source SRC3. Then the key µop may be issued on the datapaths $110_a$ and $110_b$, where the first source S1 corresponds to the permuted result of SRC3 and the second source, S2, corresponds to words W4-W7. In the first cycle (i.e., cycle 1) a temporary result, T is determined in datapath 110a, and that temporary result and the value of W7 are transferred to the opposite datapaths, as shown. Various calculations are then made in a third cycle (i.e., cycle 3) to result in the key value W8-W11. Note that the function F( ) such as performed in FIG. 3A need not be performed here, as the values for 192 key generation are not divisible by 6.

Figure 3C:
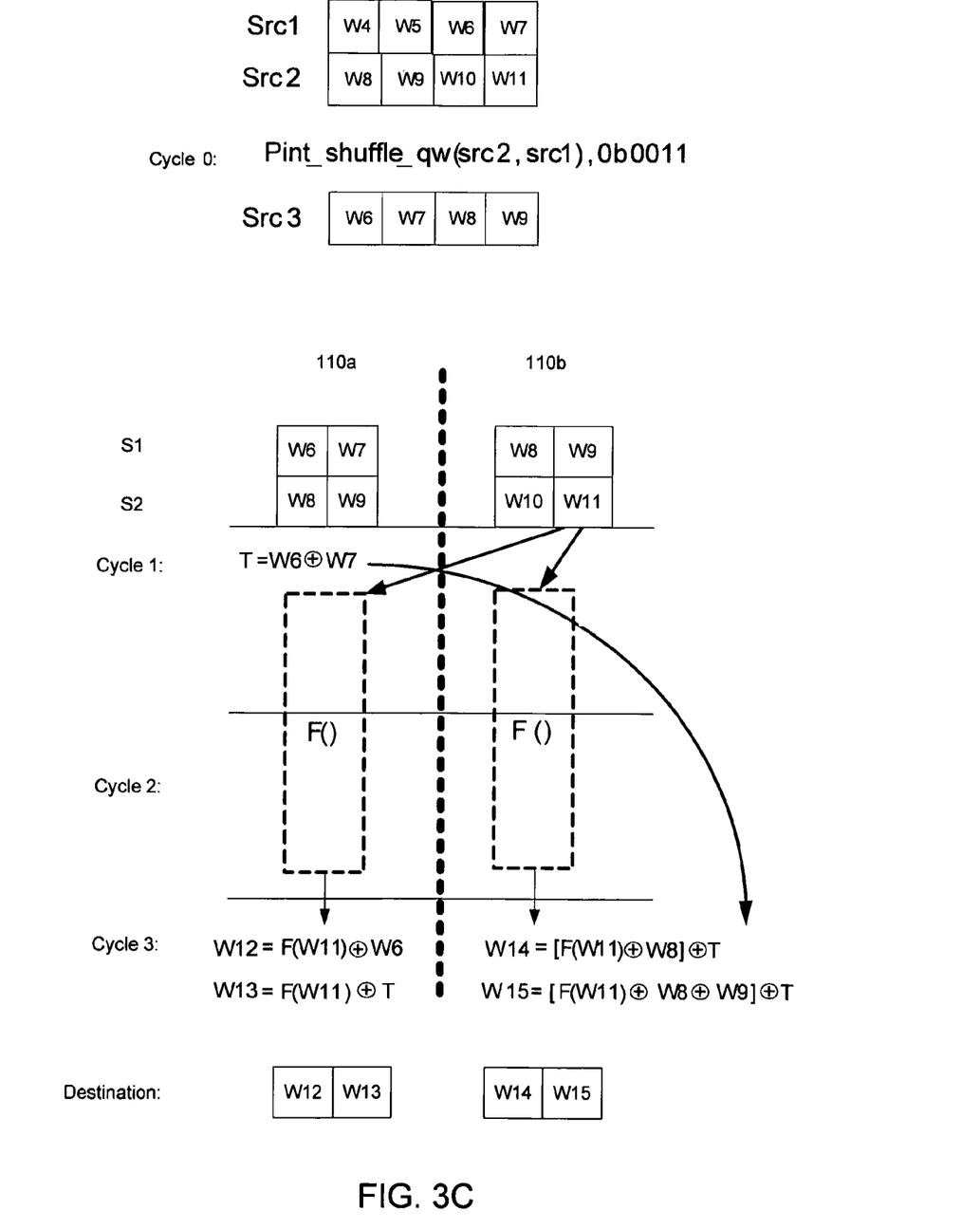
Figure 3D:
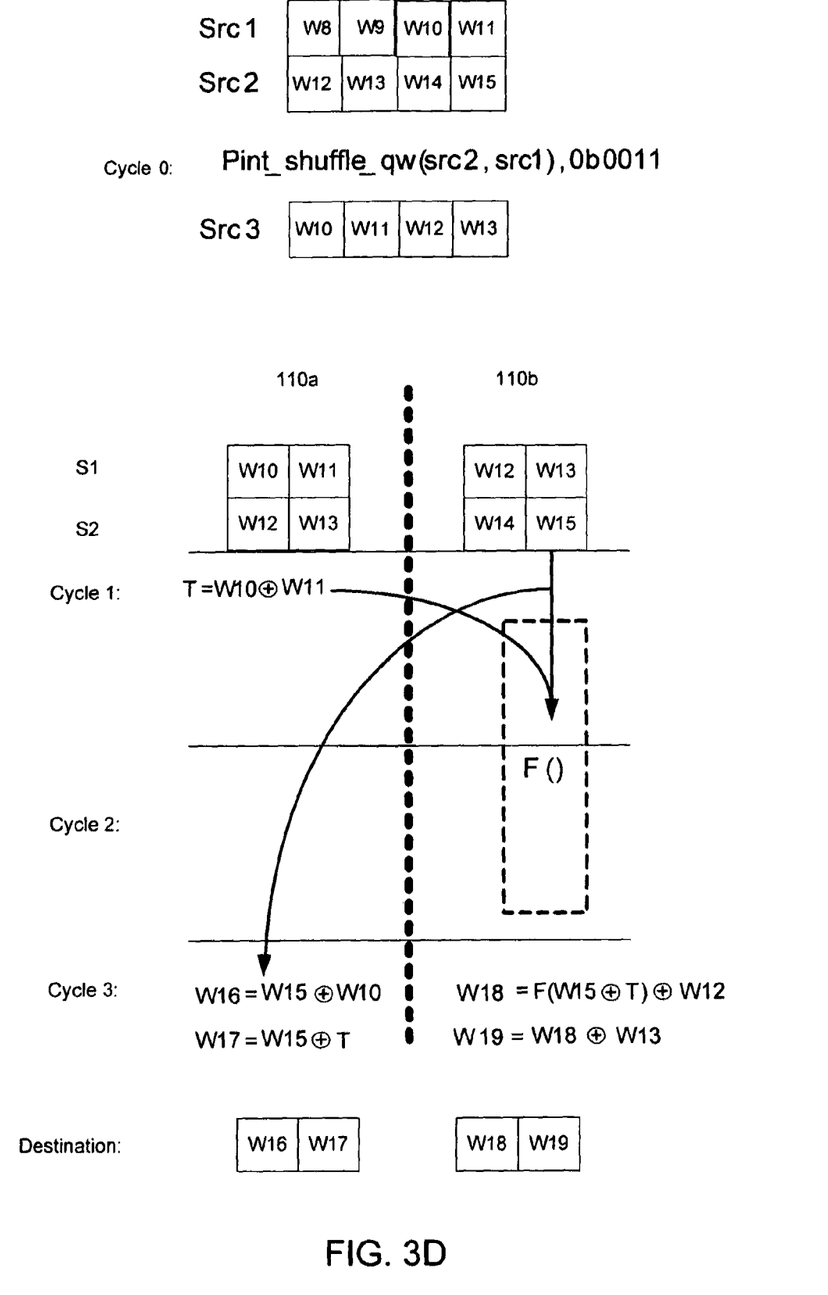

Referring now to FIG. 3C, shown is 192 key generation encrypt for a given round [3+3i]. Note that after the shuffle operation is performed, the key µop executes the same as that of the 256 encryption case shown in FIG. 3A, resulting in a round key of W12-W15. In turn, FIG. 3D shows operation of key generation for a round number [4+3i] of the 192 key generation encrypt. In this implementation, datapath 110b performs the predetermined function F( ) for W18, as that value is divisible by 6. Accordingly, execution of this round key generation leads to a result of W16-W19.

Note that the 192 bit operations have a flow where there are two µops issued per round to transfer the 128 bits of information. The critical 128/256 cases have just a single µop for the key generation and therefore have very high performance. The µop for swapping that is used in the 192 schedule is a 1-cycle operation and thus a schedule can be generated that has the same latency as all the rest.

Embodiments thus enable high performance at very high clock speeds and are area-efficient. The key scheduler can be completely eliminated from the critical path of the design with this technique. The latencies per round for all key sizes are the same. Further, the shuffle instruction can issue on a parallel ports thereby minimizing any throughput performance loss associated with 192 key generation. Thus embodiments provide a design with the minimal number of wires for the combined key generation and round operations.

Furthermore, embodiments can schedule data movement in each cycle that minimizes the amount of buses (and area) needed for key generation without adding to the critical path. Specifically, early (first cycle) data movements permit maximal sharing of buses between key generation and round operations.

Figure 4:
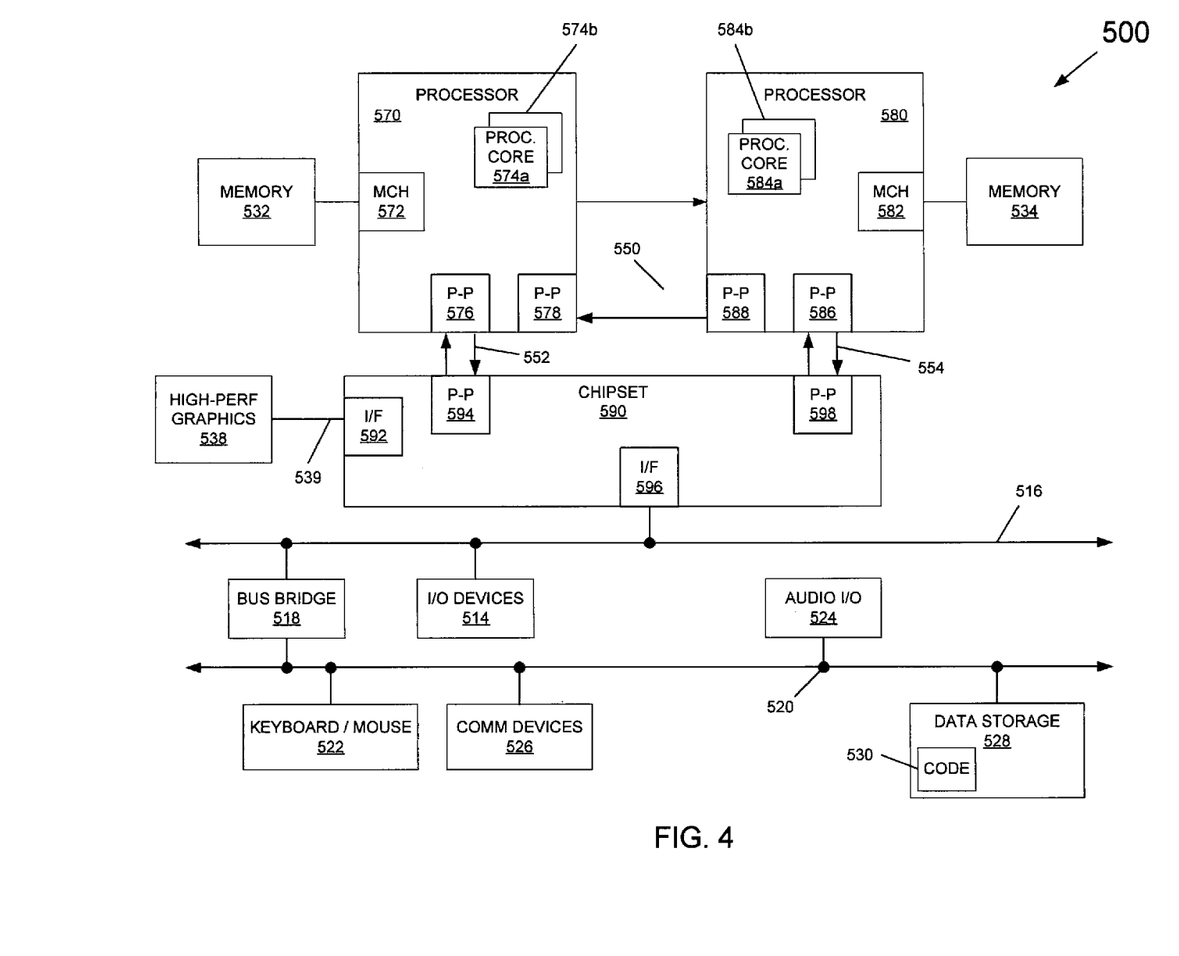
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b). Each processor core may include hardware, software, firmware or combinations thereof to handle cryptographic round operations in accordance with an embodiment of the present invention.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538 via a P-P interconnect 539. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
  a processor having dedicated logic including first and second datapaths each of a first bit width, wherein the first and second datapaths are to execute a cryptographic algorithm of a second bit width at least twice the first bit width, wherein each datapath includes:
    input logic to receive input data of the first bit width and to provide at least some of the input data to the input logic of the other datapath;
    first selection logic coupled to the input logic to receive and select a first byte or a second byte of the input data;
    a plurality of substitution boxes (SBox) coupled to the first selection logic to receive a pair of columns of the input data and to perform non-linear substitutions;
    second selection logic coupled to the SBoxes to receive and select an output from a corresponding SBox or a byte of the input data;
    mix logic coupled to the second selection logic and the SBoxes to mix the pair of columns to generate a mixed pair of columns;
    key operation logic coupled to the mix logic to receive the mixed pair of columns and a round key and to transform the mixed pair of columns into a temporary result using the round key; and
  a bus coupled between the first datapath and the second datapath, wherein the bus is of a third bit width, the third bit width less than the first bit width, wherein the bus is to transfer data of a fourth bit width from the first datapath to the second datapath and vice versa and the dedicated logic is to perform an advanced encryption standard (AES) algorithm of at least the second bit width.

2. The apparatus of claim 1, further comprising second key operation logic to receive the SBox outputs and to perform a conditional exclusive OR (XOR) operation between the SBox outputs and the round key.

3. The apparatus of claim 1, wherein each datapath further comprises key generation logic coupled to one of the SBoxes to dynamically generate a portion of the round key, wherein the key generation logic is to perform a rotate word (Rotword) operation and a conditional exclusive OR (XOR) operation, and wherein the round key is to be dynamically generated using the first and second datapaths.

4. The apparatus of claim 1, wherein the dedicated logic is to perform a round of the AES algorithm responsive to a first round micro-operation to perform the round on each of a first pair of columns in a first cycle in each of the first and second datapaths to provide a first temporary result and a second round micro-operation to perform the round on each of a second pair of columns in a next cycle following the first cycle in each of the first and second datapaths to provide a second temporary result.

5. The apparatus of claim 4, further comprising second logic coupled to the dedicated logic to perform a merge micro-operation to combine the first and second temporary results, wherein the merge micro-operation corresponds to a bitwise exclusive OR (XOR) operation.

6. The apparatus of claim 5, further comprising a microcode read only memory including a plurality of micro-operations to perform the AES algorithm, wherein the plurality of micro-operations includes a plurality of sets of the first and second round micro-operations and the merge micro-operation.

7. The apparatus of claim 5, wherein the first and second datapaths are to generate a first temporary result including a first round result, a second round result and a pair of null results responsive to the first round micro-operation and to generate a second temporary result including a third round result, a fourth round result, and a pair of null results responsive to the second round micro-operation.

8. The apparatus of claim 7, wherein the merge micro-operation is to perform the bitwise XOR operation between the first temporary result and the second temporary result to generate a result of the round of the AES algorithm corresponding to the first through fourth round results.

9. A method comprising:
  receiving an instruction in a processor having dedicated logic including a first datapath and a second datapath to generate a round key for a cryptographic algorithm;
  transferring a first portion of a first source operand from the first datapath to the second datapath in a first cycle, determining a temporary result of a logical operation between a third and fourth portion of a second operand in the second datapath and transferring the temporary result to the first datapath in the first cycle;

performing a redundant function on the first source operand in the first and second datapaths in a second cycle, based on a width of the round key and a corresponding round iteration;

calculating a plurality of values in the first datapath and the second datapath using a result of the redundant function, if performed, and the first and second operands in a third cycle;

storing the plurality of values in a destination storage, the plurality of values corresponding to the round key.

10. The method of claim 9, further comprising receiving a permute instruction and obtaining the first source operand from a third source operand and a fourth source operand responsive to the permute instruction, wherein the permute instruction is executed on a shuffle unit coupled to the first and second datapaths.

11. The method of claim 9, further comprising performing the redundant function using logic from the first and second datapaths, the logic to perform round operations of the cryptographic algorithm.

12. The method of claim 11, wherein the redundant function includes performing a rotate word operation and a conditional exclusive OR (XOR) operation in a dedicated key generation logic of the first and second datapaths.

13. The method of claim 12, further comprising performing the redundant function in a first round interval and not performing the redundant function in a second round interval.

14. An apparatus comprising:

a processor having dedicated logic including first and second datapaths each of a first bit width, wherein the first and second datapaths are to execute a cryptographic algorithm of a second bit width at least twice the first bit width, wherein each datapath includes:

input logic to receive input data of the first bit width and to provide at least some of the input data to the input logic of the other datapath;

first selection logic coupled to the input logic to receive and select a first byte or a second byte of the input data;

a plurality of substitution boxes (SBox) coupled to the first selection logic to receive a pair of columns of the input data and to perform non-linear substitutions;

second selection logic coupled to the SBoxes to receive and select an output from a corresponding SBox or a byte of the input data;

mix logic coupled to the second selection logic and the SBoxes to mix the pair of columns to generate a mixed pair of columns;

key operation logic coupled to the mix logic to receive the mixed pair of columns and a round key and to transform the mixed pair of columns into a temporary result using the round key, wherein the first datapath is to compute a result of a first column responsive to a first round micro-operation and to compute a result of a second column responsive to a second round micro-operation, and the second datapath is to compute a result of a third column responsive to the first round micro-operation and to compute a result of a fourth column responsive to the second round micro-operation.

15. The apparatus of claim 14, wherein the processor further includes a second logic to receive the results of the first, second, third and fourth columns and to combine the results.

* * * * *